(12) United States Patent
Tian

(10) Patent No.: US 10,538,214 B2
(45) Date of Patent: Jan. 21, 2020

(54) CONTROLLED IN-TANK FLOW GUIDE FOR HEAT EXCHANGER

(71) Applicant: DENSO International America, Inc., Southfield, MI (US)

(72) Inventor: Yilin Tian, Farmington, MI (US)

(73) Assignee: DENSO International America, Inc., Southfield, MI (US)

( * ) Notice: Subject to any disclaimer, the term of this patent is extended or adjusted under 35 U.S.C. 154(b) by 51 days.

(21) Appl. No.: 15/813,549

(22) Filed: Nov. 15, 2017

(65) Prior Publication Data
US 2019/0143921 A1 May 16, 2019

(51) Int. Cl.
*B60K 11/08* (2006.01)
*B60R 19/48* (2006.01)
*B62D 25/08* (2006.01)

(52) U.S. Cl.
CPC ............ *B60R 19/48* (2013.01); *B60K 11/085* (2013.01); *B62D 25/085* (2013.01); *B60R 2019/486* (2013.01)

(58) Field of Classification Search
CPC .......... F28F 9/028; B60K 11/02; B60K 11/04; B60K 11/08; B60K 11/085
USPC ......... 165/97, 100, 101, 102, 103, 174, 159; 180/68.3, 68.4
See application file for complete search history.

(56) References Cited

U.S. PATENT DOCUMENTS

| | | | | |
|---|---|---|---|---|
| 5,975,421 A * | 11/1999 | Ito | ..................... | B60H 1/00485 237/12.3 B |
| 7,096,930 B2 * | 8/2006 | Nobuta | ................... | F25B 39/04 165/132 |
| 7,231,962 B2 * | 6/2007 | Han | .................... | F28D 1/05375 165/103 |
| 7,322,399 B2 * | 1/2008 | Guerrero | ............... | F28D 1/0452 165/101 |
| 7,490,662 B2 * | 2/2009 | Eliades | ................... | F28F 27/02 123/41.1 |
| 8,091,668 B2 | 1/2012 | Amano et al. | | |
| 8,235,101 B2 * | 8/2012 | Taras | ..................... | F25B 13/00 165/101 |
| 8,292,014 B2 | 10/2012 | Sugiyama | | |
| 8,311,708 B2 | 11/2012 | Kerns | | |
| 8,347,830 B2 | 1/2013 | Tregnago et al. | | |
| 8,571,749 B2 | 10/2013 | Kawato | | |
| 8,627,911 B2 | 1/2014 | Tregnago et al. | | |
| 8,708,077 B2 | 4/2014 | Hori | | |
| 8,893,836 B2 | 11/2014 | Asano et al. | | |

(Continued)

FOREIGN PATENT DOCUMENTS

| | | |
|---|---|---|
| CN | 2874035 Y | 2/2007 |
| CN | 103759575 A | 4/2014 |
| CN | 204140190 U | 2/2015 |

*Primary Examiner* — Jeffrey J Restifo
(74) *Attorney, Agent, or Firm* — Harness, Dickey & Pierce, P.L.C.

(57) ABSTRACT

A heat exchanger including a first tank having a first inlet through which coolant flows into the first tank. A core has a plurality of coolant conduits that receive coolant from the first tank. A second tank receives coolant from the plurality of coolant conduits. The second tank has a first outlet through which coolant flows out from within the second tank. A flow guide is within the first tank or the second tank, and is movable to vary how much coolant flows through different ones of the plurality of coolant conduits.

8 Claims, 9 Drawing Sheets

(56) References Cited

U.S. PATENT DOCUMENTS

| | | |
|---|---|---|
| 8,919,470 B2 | 12/2014 | Hori |
| 8,960,343 B2 | 2/2015 | Asano et al. |
| 8,967,308 B2 | 3/2015 | Saito et al. |
| 8,983,736 B2 | 3/2015 | Hirota et al. |
| 8,991,339 B2 * | 3/2015 | Gooden .................. F28F 27/02 123/41.01 |
| 9,409,474 B2 | 8/2016 | Macfarlane et al. |
| 9,533,565 B2 | 1/2017 | Elliott et al. |
| 9,810,486 B2 * | 11/2017 | Tylutki ...................... F28F 5/00 |
| 9,856,779 B2 * | 1/2018 | Katragadda .............. F01P 11/16 |
| 9,958,219 B2 * | 5/2018 | Gosioco ................... F28F 9/22 |
| 10,247,490 B2 * | 4/2019 | Taylor ................... F28D 1/0233 |
| 2006/0191677 A1 * | 8/2006 | Viczena ............. F28D 1/05316 165/260 |
| 2008/0060592 A1 * | 3/2008 | Mehring ................... F01P 3/02 123/41.72 |
| 2008/0078537 A1 * | 4/2008 | Desai ................... F28D 1/0435 165/140 |
| 2009/0166022 A1 * | 7/2009 | Desai ................... F28D 1/0443 165/279 |
| 2010/0243352 A1 | 9/2010 | Watanabe et al. |
| 2010/0262301 A1 * | 10/2010 | Schwartz ............... B60K 6/405 700/282 |
| 2011/0073285 A1 * | 3/2011 | Benoit .................... F01P 7/165 165/104.28 |
| 2011/0288717 A1 | 11/2011 | Yu et al. |
| 2012/0100790 A1 | 4/2012 | Miesterfeld et al. |
| 2013/0095740 A1 | 4/2013 | Hori |
| 2013/0103265 A1 | 4/2013 | Remy et al. |
| 2013/0223980 A1 | 8/2013 | Pastrick et al. |
| 2013/0252531 A1 | 9/2013 | Asano et al. |
| 2013/0268164 A1 | 10/2013 | Sugiyama |
| 2014/0288760 A1 | 9/2014 | Asano et al. |
| 2014/0299077 A1 | 10/2014 | Sowards et al. |
| 2015/0176925 A1 * | 6/2015 | Tylutki ...................... F28F 5/00 165/96 |
| 2015/0191078 A1 | 7/2015 | Miyaji et al. |
| 2015/0247678 A1 * | 9/2015 | Tylutki ................ F28D 1/05325 165/103 |
| 2016/0108837 A1 | 4/2016 | Sugimoto |
| 2016/0368366 A1 | 12/2016 | Miller et al. |

\* cited by examiner

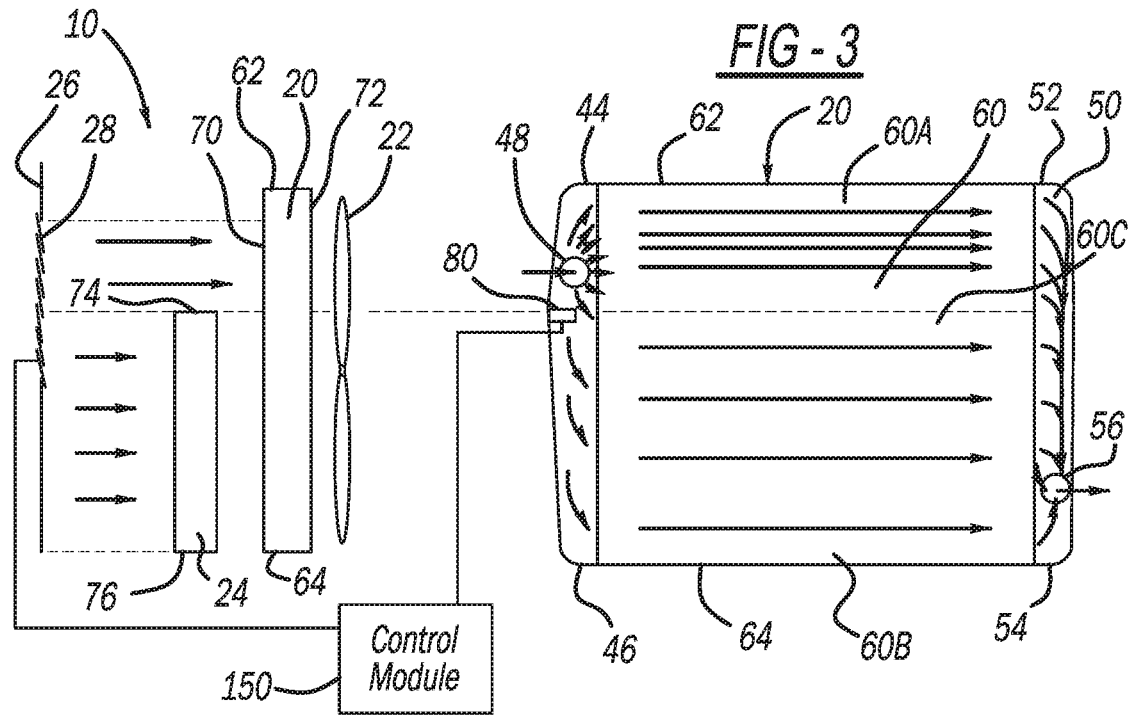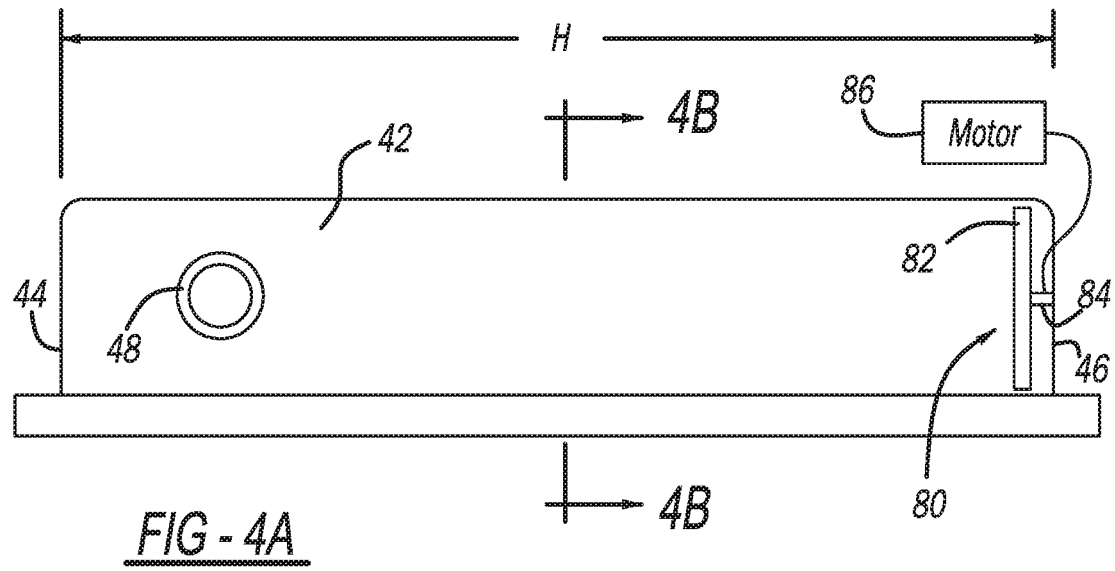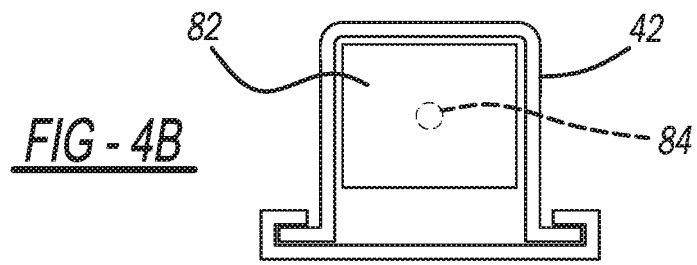

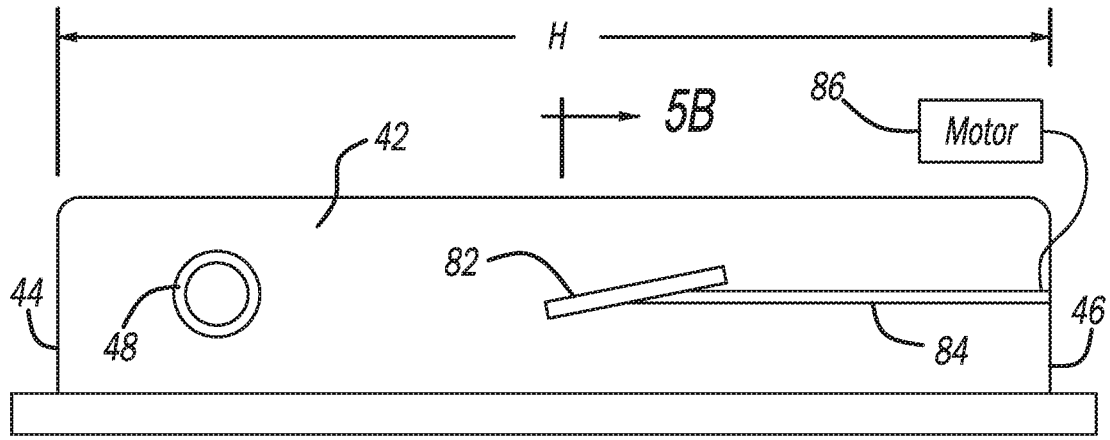
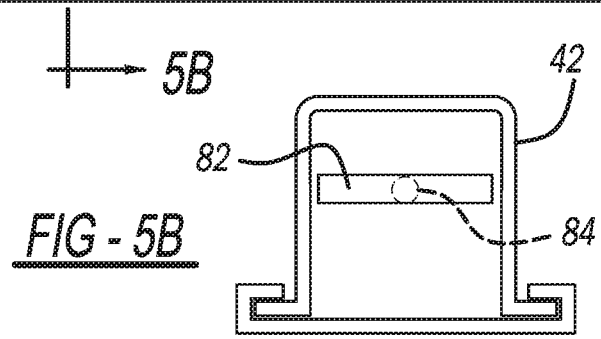
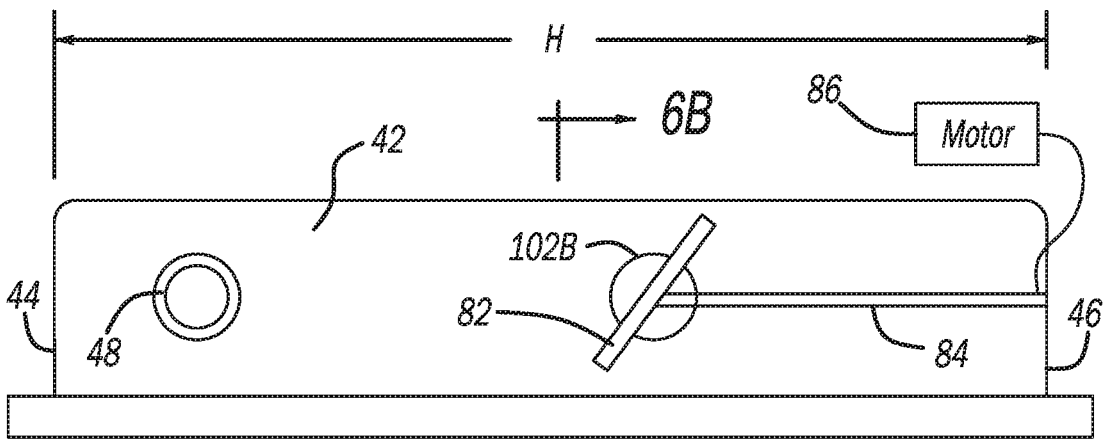
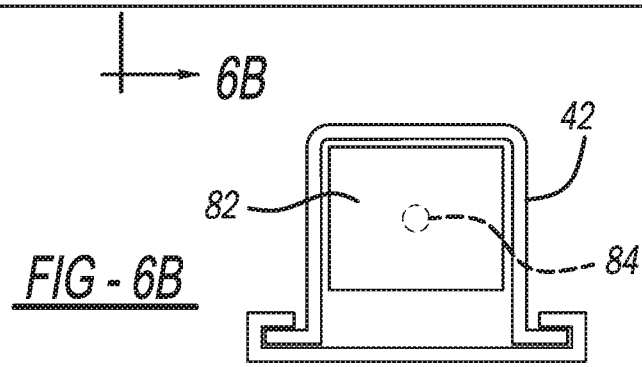

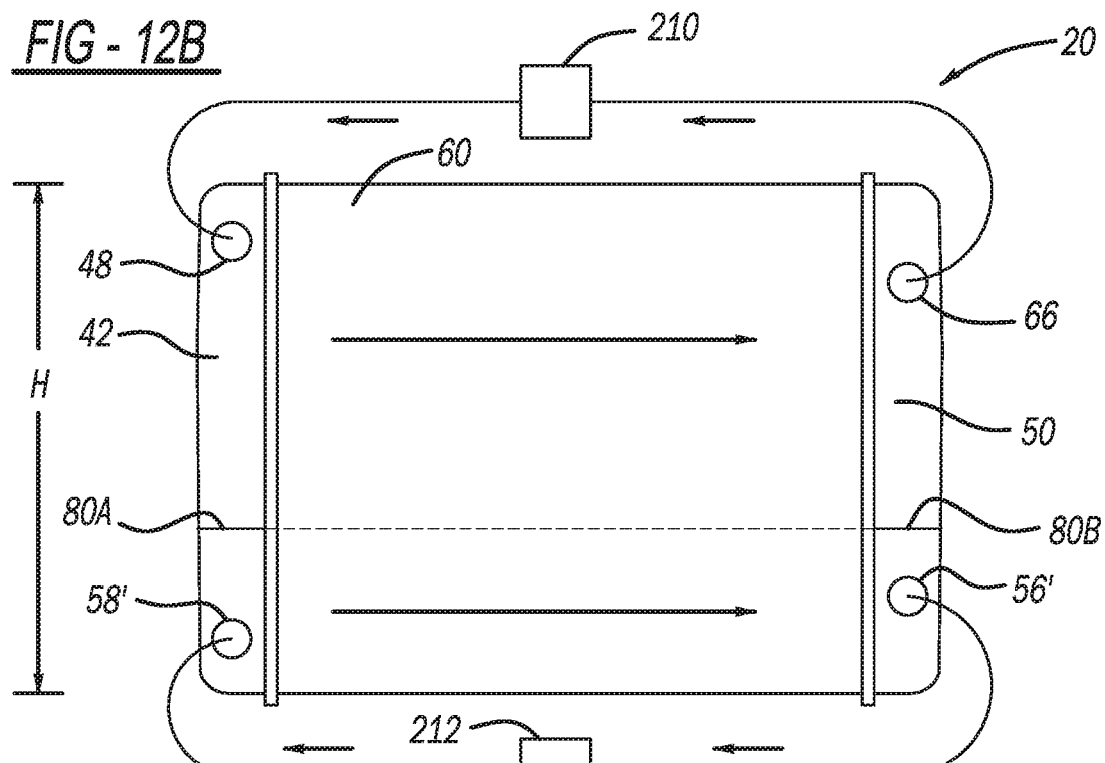
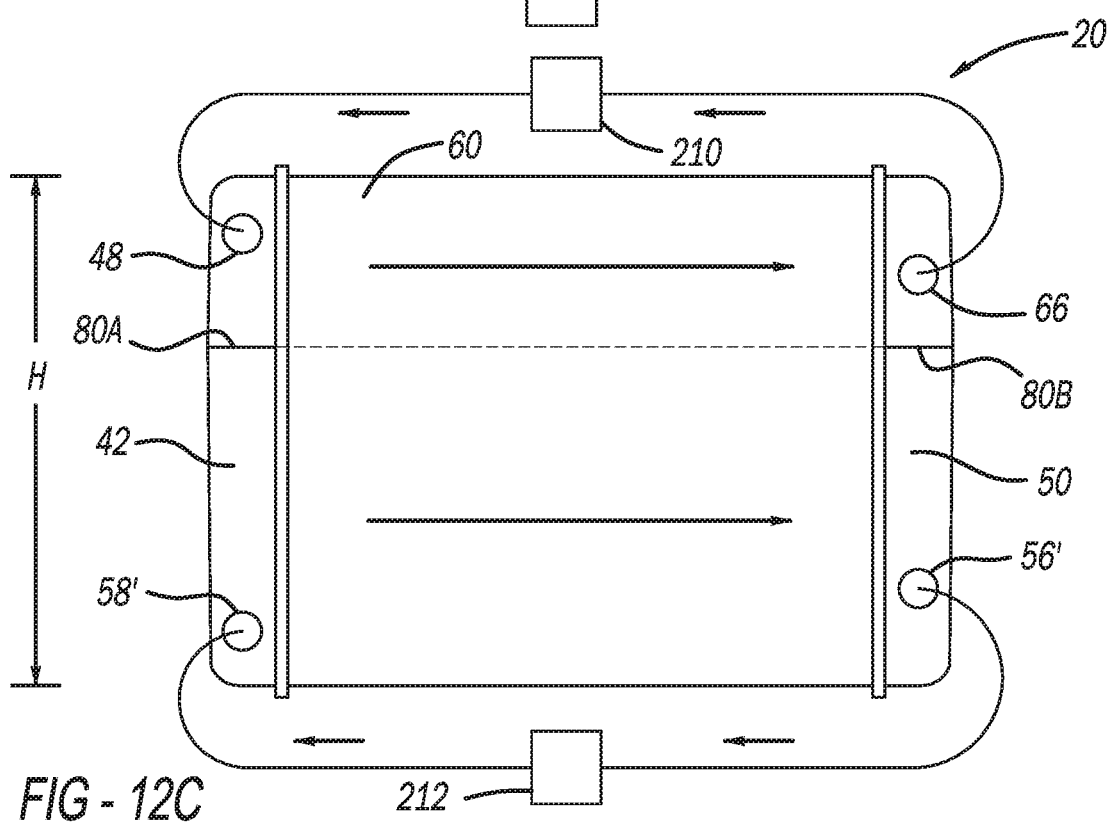

CONTROLLED IN-TANK FLOW GUIDE FOR HEAT EXCHANGER

FIELD

The present disclosure relates to a flow guide that controls coolant flow through a heat exchanger.

BACKGROUND

This section provides background information related to the present disclosure, which is not necessarily prior art.

More and more vehicles are being outfitted with an active grill shutter. A typical active grill shutter includes a plurality of shutters (louvers), and is arranged at (or near) a front end of a vehicle. When the shutters are closed, airflow is routed around the vehicle to lessen aerodynamic drag and improve fuel economy. However, when the shutters are closed less airflow passes through the radiator, which can reduce radiator performance. When the shutters are open, they increase airflow through the radiator and into the engine compartment to promote cooling. However, performance of the radiator can be negatively affected, as can durability due to thermal stress. The present disclosure advantageously provide for a controlled in-tank flow guide for a heat exchanger, which overcomes these issues in the art, as well as numerous others, as explained in detail herein.

SUMMARY

This section provides a general summary of the disclosure, and is not a comprehensive disclosure of its full scope or all of its features.

The present disclosure provides for a heat exchanger. The heat exchanger includes a first tank having a first inlet through which coolant flows into the first tank. A core has a plurality of coolant conduits that receive coolant from the first tank. A second tank receives coolant from the plurality of coolant conduits. The second tank has a first outlet through which coolant flows out from within the second tank. A flow guide is within the first tank or the second tank, and is movable to vary how much coolant flows through different ones of the plurality of coolant conduits.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 illustrates the system of FIG. 1 with the flow guide in a second extended position;

FIG. 4A illustrates the exemplary flow guide in a retracted position;

FIG. 4B is a cross-sectional view taken along line 4B-4B of FIG. 4A;

FIG. 5A illustrates the exemplary flow guide in an extended position;

FIG. 5B is a cross-sectional view taken along line 5B-5B of FIG. 5A;

FIG. 6A illustrates the exemplary flow guide in the extended position and rotated from the position illustrated in FIG. 5A;

FIG. 6B is a cross-sectional view taken along line 6B-6B of FIG. 6A;

FIG. 12B illustrates the heat exchanger of FIG. 12A with flow guides thereof in a first position;

FIG. 12C illustrates the heat exchanger of FIG. 12A with flow guides thereof in a second position;

Corresponding reference numerals indicate corresponding parts throughout the several views of the drawings.

DETAILED DESCRIPTION

Example embodiments will now be described more fully with reference to the accompanying drawings.

Figure 1:
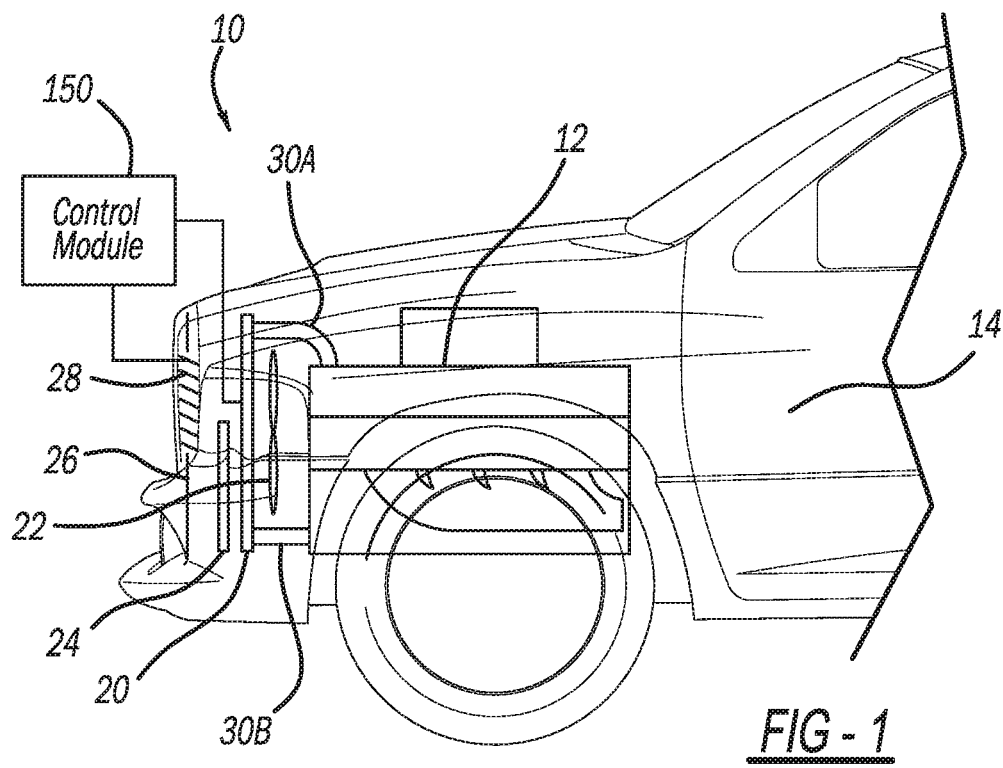
FIG. 1 illustrates an exemplary vehicle including a system in accordance with the present disclosure for controlling flow of coolant through a heat exchanger.

With initial reference to FIG. 1, a cooling system in accordance with the present disclosure is generally illustrated at reference numeral 10. The cooling system 10 is suitable for cooling any suitable device, such as vehicle engine 12, any suitable motor, any suitable inverter coolers, etc. The engine 12 is illustrated as installed in a vehicle 14. However, the cooling system 10 is suitable for cooling any suitable non-vehicular engine as well. With respect to vehicles, although the vehicle 14 is illustrated as a passenger vehicle, the engine 12 can be configured to power any other suitable vehicle, such as any suitable recreational vehicle, mass transit vehicle, military vehicle, construction vehicle/equipment, watercraft, aircraft, etc.

The cooling system 10 further includes a heat exchanger 20, which can be any suitable heat exchanger, such as a radiator. The radiator 20 is arranged between a fan 22 and an obstacle 24. The obstacle 24 can be any obstacle that would impact airflow to the radiator 20. For example, the obstacle 24 can be one or more of an oil cooler, a low temperature radiator, a radiator, and a condenser. In the examples set forth herein, the obstacle is referred to as a condenser 24. The condenser 24 can be any suitable condenser for use with an air conditioning system of the vehicle 14. The condenser 24 is in receipt of refrigerant in the form of high pressurized gas. As the refrigerant passes through the condenser 24 when the air conditioning system of the vehicle 14 is activated, the refrigerant cools and converts from a high pressure gas to a high pressure liquid, and heat of the refrigerant transfers to airflow flowing through the condenser 24.

The condenser 24 is arranged between the radiator 20 and an active grill 26. The active grill 26 includes a plurality of louvers or shutters 28. The louvers 28 can be selectively opened and closed to improve the aerodynamics of the vehicle 14. For example, when the louvers 28 are closed, airflow is routed around the vehicle 14 to decrease aerodynamic drag and improve fuel economy. When the louvers 28 are open, airflow passes therethrough to increase airflow through the condenser 24 and the radiator 20, which increases airflow into an engine compartment of the vehicle 14 to facilitate cooling of the engine 12. The louvers 28 can be opened and closed in any suitable manner, and can be controlled by, for example, a control module 150.

In this application, including the definitions below, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module set forth herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The radiator 20 is connected to the engine 12 by coolant tubes 30A and 30B. Coolant tube 30A provides a conduit for engine coolant flowing from the engine 12 to the radiator 20. Coolant tube 30B provides a conduit for coolant flowing from the radiator 20 back to the engine 12.

With continued reference to FIG. 1, and additional reference to FIG. 2, the radiator 20 will now be described in additional detail. The radiator 20 includes an inlet tank 42, which has an upper end 44 and a lower end 46. The inlet tank 42 includes an inlet 48, which in the example illustrated is closer to the upper end 44 than the lower end 46. Coolant is introduced into the inlet tank 42 through the inlet 48. Thus the inlet 48 can be connected to the coolant tube 30A, which extends from the engine 12 to the inlet 48.

The radiator 20 further includes an outlet tank 50, which has an upper end 52 and a lower end 54. The outlet tank 50 includes an outlet 56, through which coolant can exit the outlet tank 50. In the example illustrated, the outlet 56 is closer to the lower end 54 than the upper end 52.

Between the inlet tank 42 and the outlet tank 50 is a core 60 of the radiator 20. The core 60 includes a plurality of coolant conduits (such as coolant tubes, for example) extending between the inlet tank 42 and the outlet tank 50. The coolant conduits of the core 60 transport coolant from the inlet tank 42 to the outlet tank 50. In the example illustrated, the core 60 includes a first or upper portion 60A, a second or lower portion 60B, and a third or intermediate portion 60C. The upper portion 60A is proximate to an upper end 62 of the core 60. The lower portion 60B is proximate to a lower end 64 of the core 60. The intermediate portion 60C is between the upper portion 60A and the lower portion 60B.

The radiator 20 is arranged such that an upstream side 70 faces the active grill 26, and a downstream side 72 faces the fan 22. The lower end 64 of the core 60 is generally coplanar with a lower end 76 of the condenser 24. The upper end 62 of the core 60 is above an upper end 74 of the condenser 24. The radiator 20 has a width W extending from the inlet tank 42 to the outlet tank 50, and across the core 60. A height H of the radiator 20 extends between the upper end 62 and the lower end 64 of the core 60 (as well as between the upper end 44 and the lower end 46 of the inlet tank 42, and further between the upper end 52 and the lower end 54 of the outlet tank 50).

The height H of the radiator 20 is greater than a height of the condenser 24. Thus the radiator 20 includes a first portion that is above the upper end 74 of the condenser 24, and thus does not face the condenser 24. The radiator 20 includes a second portion that is below the upper end 74 of the condenser 24, and does face the condenser 24. Therefore, when the fan 22 is activated (and/or the louvers 28 of the active grill 26 are open) a first portion of airflow will flow over the upper end 74 of the condenser 24 and through the radiator 20 without flowing through the condenser 24. A second portion of airflow will flow through both the condenser 24 and the radiator 20.

In the example illustrated, the upper portion 60A of the core 60 is above the upper end 74 of the condenser 24, and thus airflow passing through the upper portion 60A will not have passed through the condenser 24. The lower portion 60B and the intermediate portion 60C of the core 60 are opposite to the condenser 24, and thus airflow flowing through the lower portion 60B and the intermediate portion 60C will have previously passed through the condenser 24. In the example illustrated, when the air conditioner of the vehicle 14 is active and refrigerant is flowing through the condenser 24, airflow passing through the upper portion 60A of the core 60 will generally be cooler than airflow that has passed through the relatively warm condenser 24 and either the lower or intermediate portions 60B and 60C of the core 60.

The radiator 20 further includes a flow guide (or flow guide assembly) 80. The flow guide 80 can be arranged in the inlet tank 42 or the outlet tank 50. In some applications, both the inlet tank 42 and the outlet tank 50 can include a flow guide 80. The flow guide 80 will now be more specifically described with respect to being arranged in the inlet tank 42. The flow guide 80 will be similarly configured when included with the outlet tank 50, and thus the description of the flow guide 80 with respect to the inlet tank 42 is also sufficient to describe the flow guide 80 when included in the outlet tank 50. The flow guide 80 is movable along the height H of the inlet tank 42 in order to control coolant flow through the different coolant conduits of the core 60, in response to whether or not the louvers 28 of the active grill 26 are open or closed, and whether the condenser 24 (and air conditioner) is active. For example and as illustrated in FIG. 3, when the louvers 28 are closed and the air conditioner is active, the flow guide 80 is moved along the height H of the inlet tank 42 to a position that is generally opposite to the upper end 74 of the condenser 24. The flow guide 80 is moved in response to a command received from the control module 150, for example. The flow guide 80 is further arranged, as described herein, to direct more coolant flow through the upper portion 60A of the core 60, which receives airflow that has passed through the radiator 20, but not through the condenser 24.

Because the airflow passing through the upper portion 60A of the core 60 has not passed through the condenser 24, the airflow passing through the upper portion 60A is generally cooler than the airflow passing through the lower portion 60B and the intermediate portion 60C, which has passed through the relatively warm condenser 24 with refrigerant being pumped therethrough. By arranging the flow guide 80 to direct more coolant through the upper portion 60A of the core 60 as compared to the lower portion 60B and the intermediate portion 60C, the heat rejection efficiency of the radiator 20 is advantageously improved. Since flow guide 80 improves the cooling efficiency of the radiator 20, the total flow rate of coolant through the radiator 20 can be reduced, thus reducing the amount of power needed for a coolant pump, which will improve overall fuel economy of the vehicle.

When the air conditioning of the vehicle 14 is off, the condenser 24 will generally not be warm and not influence the temperature of airflow passing therethrough. As a result, when the air conditioning is off, and particularly when the louvers 28 are closed, the flow guide 80 can be positioned in any suitable manner so as to not affect coolant flow through the core 60, and promote uniform coolant flow through the core 60.

Figure 2:
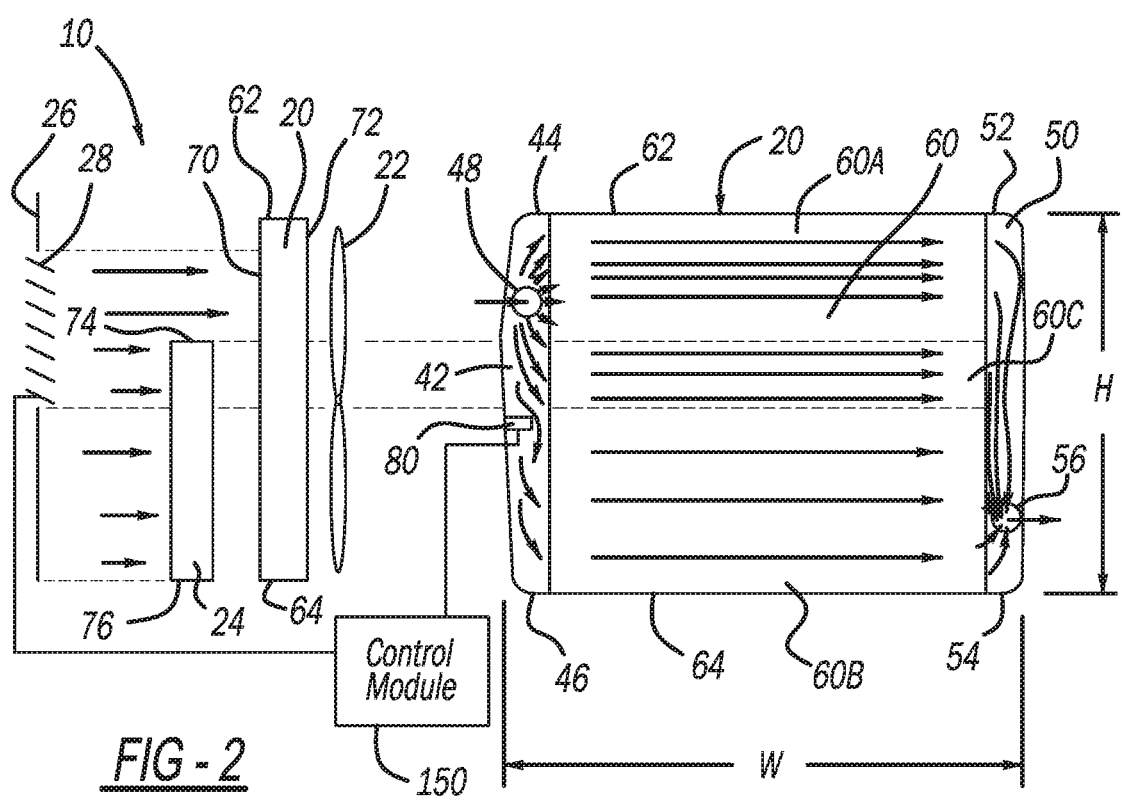
FIG. 2 illustrates the system of FIG. 1 including an exemplary flow guide that controls flow of coolant through the heat exchanger, the flow guide in a first extended position.

When the louvers 28 of the active grill 26 are opened and the condenser 24 is active, as is illustrated in FIG. 2, the control module 150 repositions the flow guide 80 to take into account the change in airflow through the radiator 20. Specifically when the louvers 28 are open, airflow through the upper portion 60A, which is relatively cooler than the remainder of the airflow as a result of not having passed through the warm condenser 24, increases. Airflow passing through an upper portion of the condenser 24 proximate to the upper end 74, and through the intermediate portion 60C of the radiator 20 also increases. To take advantage of the increased airflow through the upper portion 60A and the intermediate portion 60C of the radiator 20, the control module 150 positions the flow guide 80 at a height H of the inlet tank 42 that is generally opposite to a lower end of the louvers 28, as illustrated in FIG. 2. Arranging the flow guide 80 at this position increases coolant flow through the upper portion 60A and the intermediate portion 60C of the radiator 20, while decreasing coolant flow through the lower portion 60B of the radiator 20. As a result, efficiency of the radiator 20 is further increased, which advantageously improves the heat rejection efficiency of the radiator 20, thereby allowing the total coolant flow rate through the radiator 20 to be further reduced, which reduces power consumption of the coolant pump and improves fuel efficiency of the vehicle 14.

Concentrating coolant flow through the upper portion 60A of the core 60 (and through the intermediate portion 60C when the louvers 28 are open) advantageously improves thermal management of the radiator 20. For example, without the flow guide 80 concentrating coolant flow at the upper portion 60A and/or the intermediate portion 60C, the heat differential between warm coolant flowing through an upper portion of the radiator 20 proximate to the upper end 62, and relatively cooler coolant flowing through the core 60 proximate to the lower end 64, may result in undesirable thermal stress on the core 60. By positioning the flow guide 80 to concentrate coolant flow of relatively warm coolant through the upper portion 60A and/or the intermediate portion 60C, while limiting or eliminating coolant flow of relatively cooler coolant through the lower portion 60B advantageously reduces thermal stress on the core 60.

During cold weather conditions and low load driving conditions, the present disclosure advantageously provide for sub-cooling of the coolant by positioning the flow guide 80 to direct coolant flow through less than an entirety of the coolant conduits of the core 60. For example, the flow guide 80 can be arranged halfway between the upper end 62 and the lower end 64 of the core 60, or higher towards the upper end 62, to limit or at least concentrate coolant flow through the coolant conduits of the core 60 towards the upper end 62. As a result of using fewer of the coolant conduits of the core 60, control over coolant temperature exiting the outlet 56 is increased, and thermal stress on the core 60 can be reduced.

With additional reference to FIGS. 4A and 4B, the flow guide assembly 80 will now be described in additional detail. The flow guide assembly 80 includes a guide plate 82 and an extension mechanism 84. The guide plate 82 is described as a plate, but can take any other suitable form sufficient to control flow of coolant from the inlet tank 42 to the coolant conduits of the core 60. The extension mechanism 84 is any mechanism suitable to move the guide plate 82 along the height H of the inlet tank 42. Any suitable motor 86 can be used to control movement of the extension mechanism 84, and rotation of the guide plate 82. FIGS. 4A and 4B illustrate the flow guide assembly 80 in an off mode, in which the extension mechanism 84 is retracted and the guide plate 82 is at the lower end 46 of the inlet tank 42 so as to not affect flow of coolant from the inlet tank 42 to the core 60.

FIGS. 5A and 5B illustrate the flow guide 80 in an extended position in which the motor 86 has been activated to extend the extension mechanism 84 and move the guide plate 82 along the height H of the inlet tank 42. The motor 86 can be controlled by the control module 150 to move the guide plate 82 to any suitable position along the height H of the inlet tank 42, such as to either of the positions illustrated in FIGS. 2 and 3. The guide plate 82 is rotated from the position of FIGS. 4A and 4B to the position of FIGS. 5A and 5B to facilitate movement of the guide plate 82 through coolant of the inlet tank 42 as the guide plate 82 is being moved along the height H away from the lower end 46. The guide plate 82 can be moved, for example, about 90° from the position of FIGS. 4A and 4B to the position of FIGS. 5A and 5B. After the extension mechanism 84 positions the guide plate 82 at a desired height H of the inlet tank 42, the guide plate 82 is rotated in any suitable manner in order to direct coolant from the inlet tank 42 into desired coolant conduits of the core 60. The guide plate 82 can be rotated by, for example, exemplary flow guide rotation mechanism 100 described herein, such as in conjunction with the descriptions of FIG. 7A and FIG. 8.

Figure 7A:
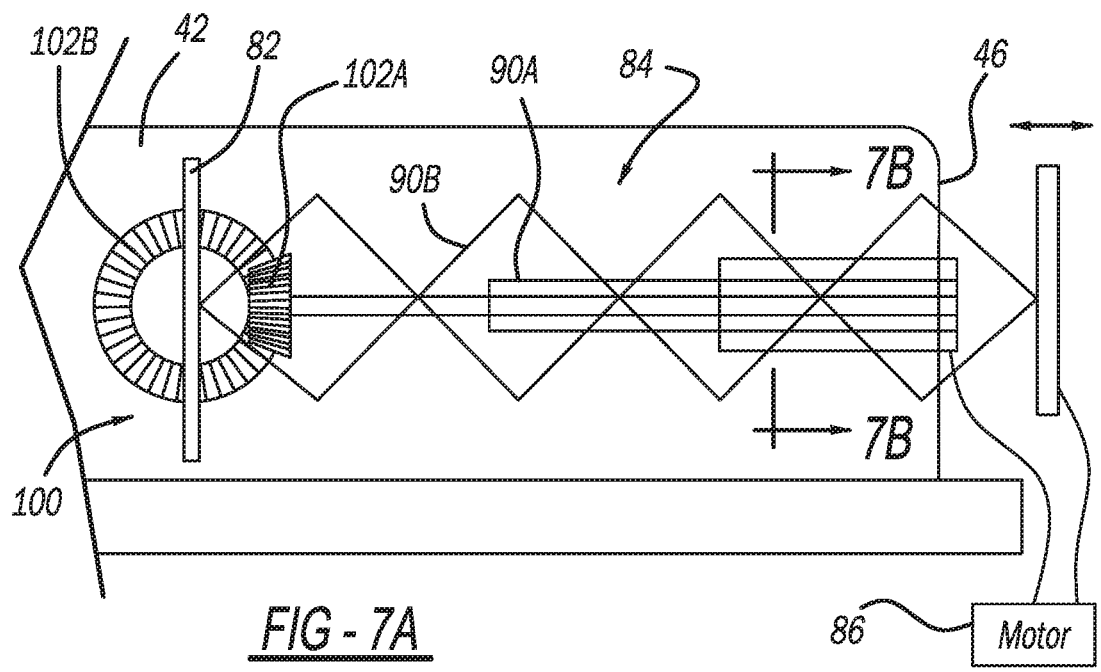
FIG. 7A illustrates an exemplary flow guide extension mechanism of an exemplary flow guide positioning assembly in accordance with the present disclosure.
Figure 7B:
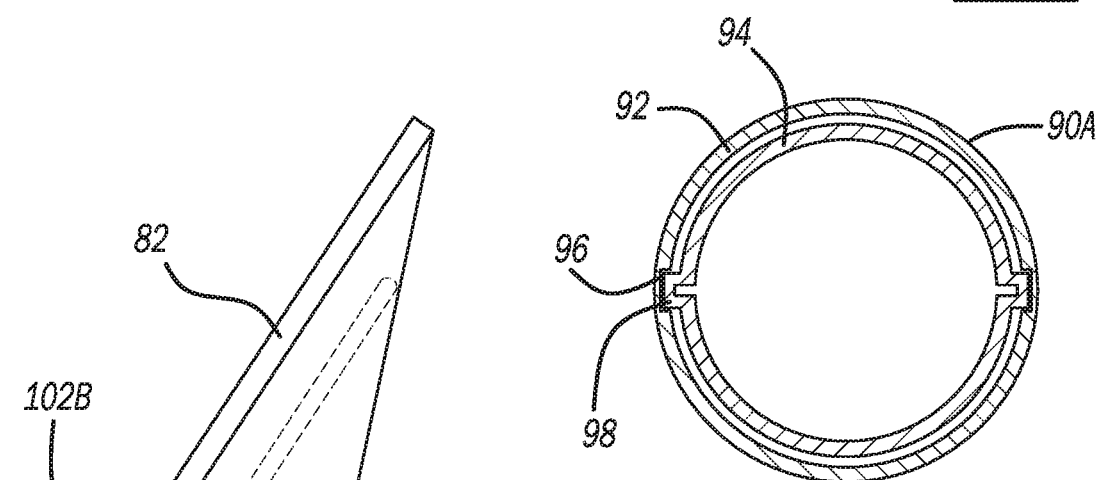
FIG. 7B is a cross-sectional view taken along line 7B-7B of FIG. 7A.
Figure 8:
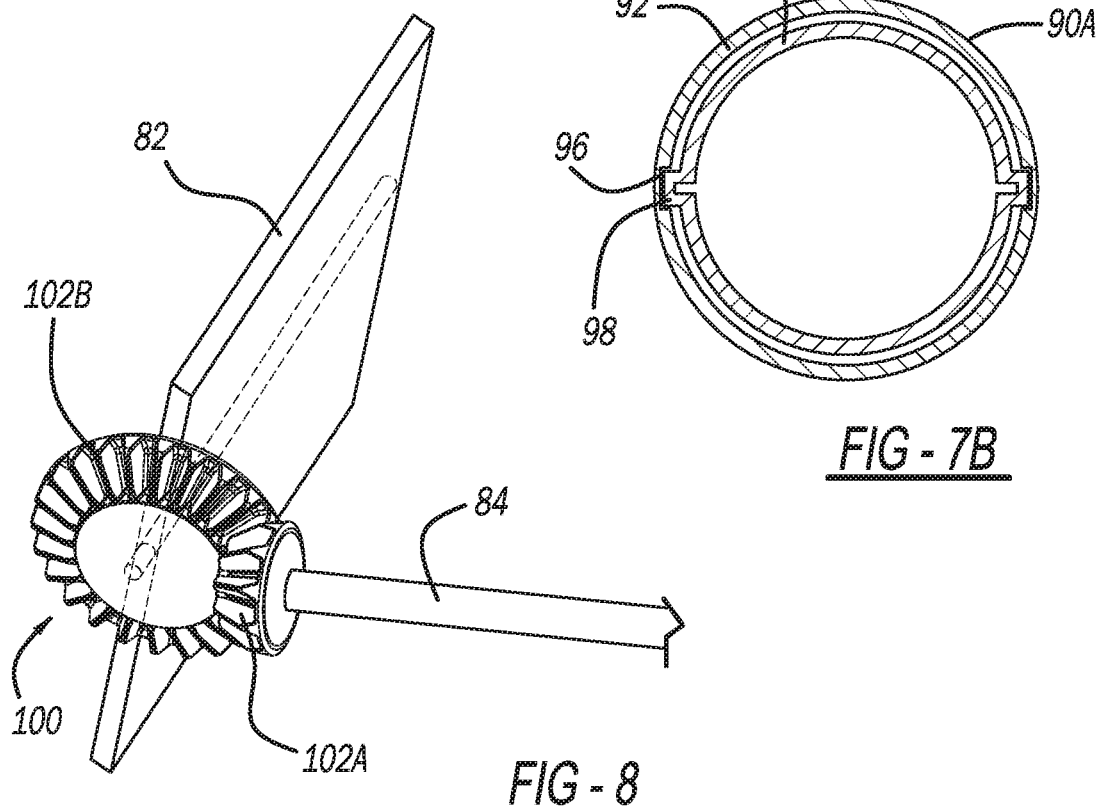
FIG. 8 illustrates an exemplary flow guide rotation mechanism in in accordance with the present disclosure.

FIG. 7A illustrates an exemplary extension mechanism 84 including telescoping members 90A and 90B. With additional reference to FIG. 7B, telescoping member 90A includes an outer cylinder 92 and an inner cylinder 94. The outer cylinder 92 defines a recess 96, which receives a knob 98 of the inner cylinder 94 as the telescoping members 90A and 90B move in a telescoping manner to change position of the guide plate 82 along the height H of the inlet tank 42. To lock the inner and outer cylinders 92 and 94 at a desired height, the cylinders 92 and 94 are rotated relative to one another, which results in the knob 98 moving out from within the recess 96 and abutting an inner surface of the outer cylinder 92. Such cooperation between the knob 98 and the outer cylinder 92 fixes the cylinders 92 and 94 relative to one another. With reference to FIG. 7A and FIG. 8, the flow guide rotation mechanism 100 in the example illustrated includes a first gear 102A and a second gear 102B, which is meshed with the first gear 102A. In the example illustrated, the extension mechanism 84 rotates the first gear 102A, which rotates the second gear 102B. The second gear 102B is connected to the guide plate 82. Thus rotation of the second gear 102B rotates the guide plate 82 to change the angle of the guide plate 82, and the opening angle of the inlet tank 42 through which coolant flows along the inlet tank 42 towards the core 60 and the lower end 46 of the inlet tank 42.

Figure 9:
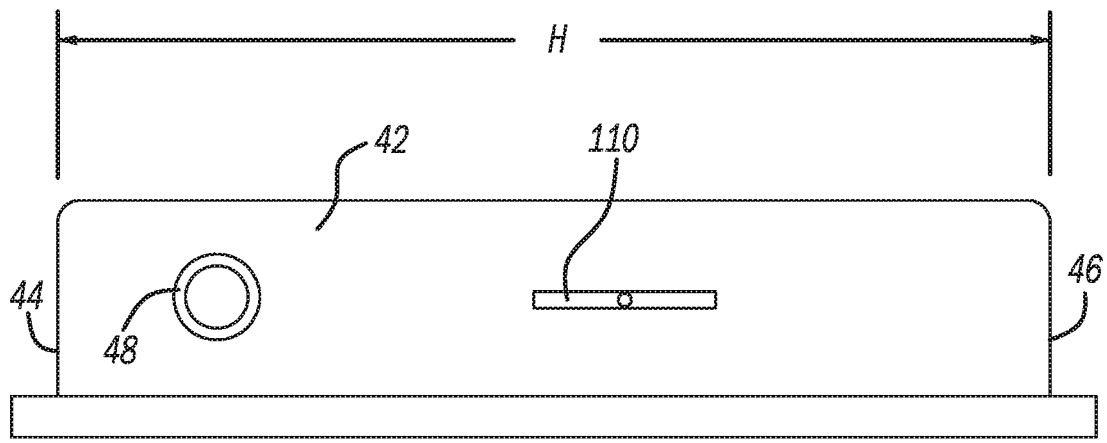
FIG. 9 illustrates another exemplary flow guide in accordance with the present disclosure, the flow guide in an open position.
Figure 10:
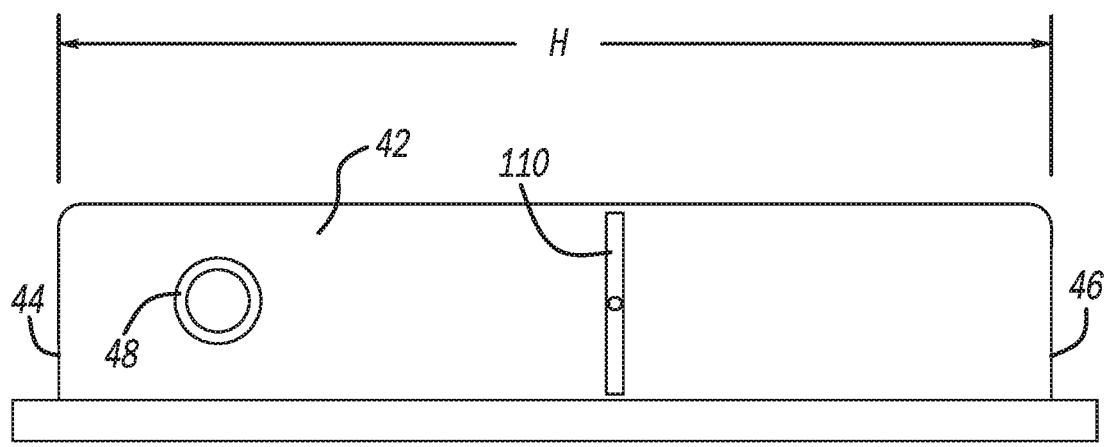
FIG. 10 illustrates the flow guide of FIG. 9 in a closed position.

With additional reference to FIGS. 9 and 10, another guide plate in accordance with the present disclosure is illustrated at reference numeral 110. The guide plate 110 is fixed along a height H of the inlet tank 42. The guide plate 110 is rotatable using any suitable flow guide rotation mechanism. Thus the guide plate 110 of FIGS. 9 and 10 illustrates a relatively simplified guide plate 110 that is stationary along the inlet tank 42, and directs coolant only by rotating, such as from the position of FIG. 9 in which coolant flows freely across the guide plate 110 through the inlet tank 42, to the position of FIG. 10 in which coolant is blocked from flowing past the guide plate 110. The guide plate 110 can be rotated in any suitable manner, such as by any suitable motor.

Figure 11A:
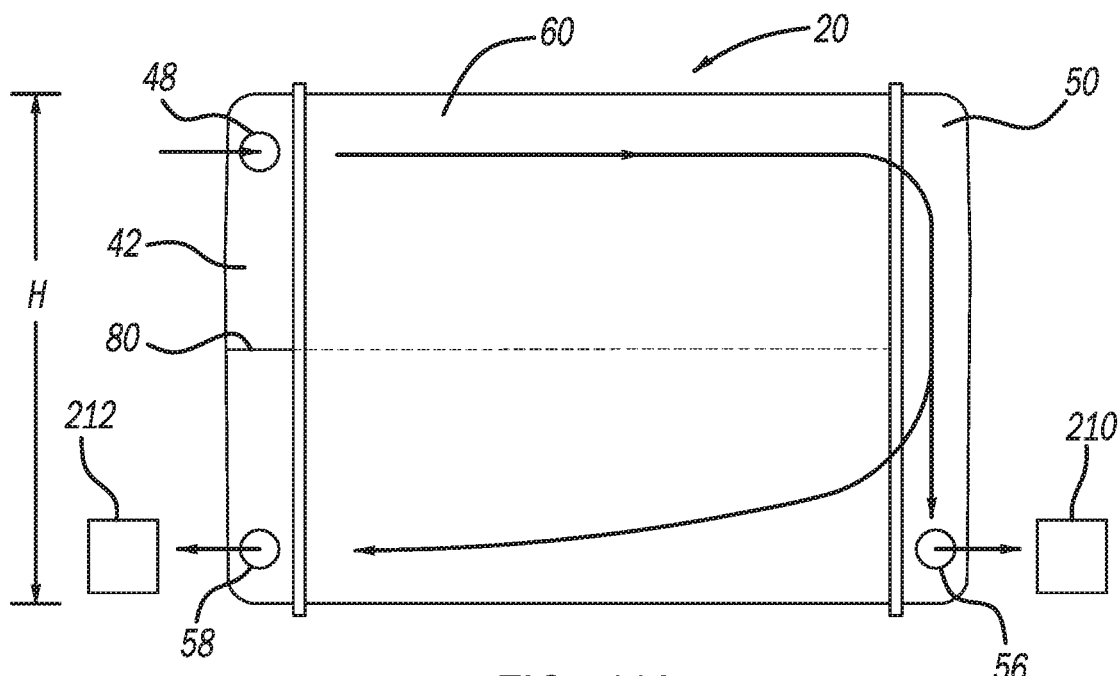
FIG. 11A is a plan view of another heat exchanger in accordance with the present disclosure.
Figure 11B:
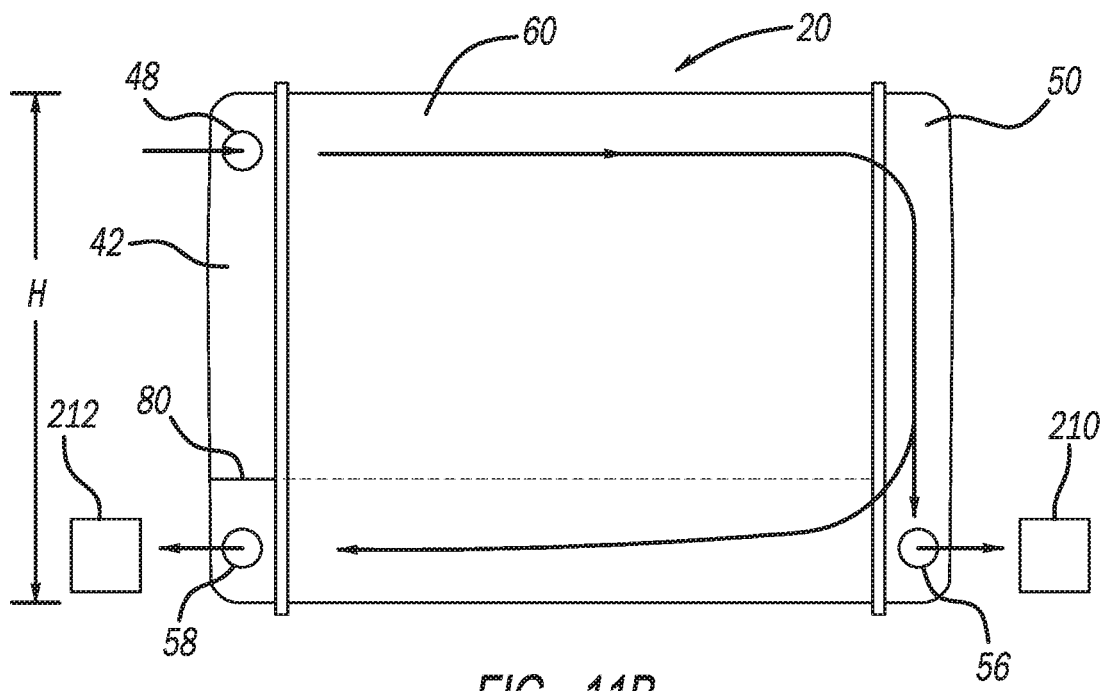
FIG. 11B illustrates the heat exchanger of FIG. 11A with a flow guide thereof in a first position.
Figure 11C:
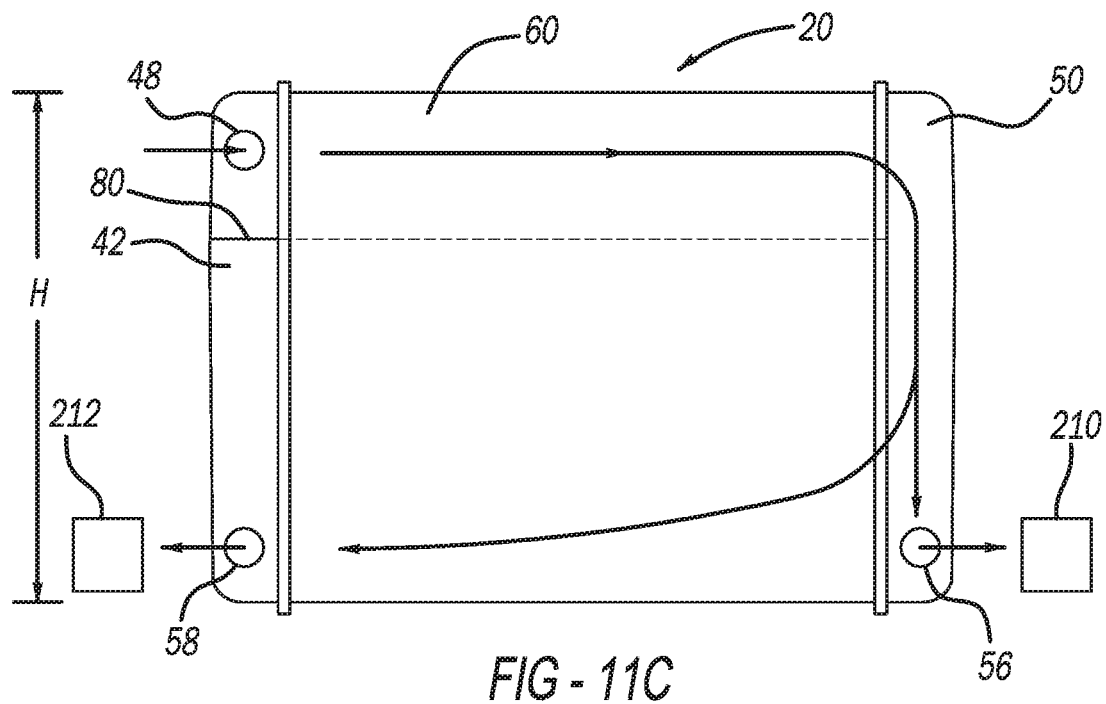
FIG. 11C illustrates the heat exchanger of FIG. 11A with the flow guide thereof in a second position.

FIGS. 11A, 11B, and 11C illustrate an additional configuration of the heat exchanger 20 in accordance with the present disclosure. For the heat exchanger 20 of FIGS. 11A-11C, the outlet 56 is a first outlet. An additional outlet is included in the tank 42 in the form of a second outlet 58. Thus in the example of FIGS. 11A-11C, the tank 42 is both an inlet tank and an outlet tank. The flow guide 80 is arranged to prevent coolant from flowing through the tank 42 directly from the inlet 48 to the second outlet 58. Specifically, the flow guide 80 is arranged to extend entirely across a width of the tank 42 to prevent coolant from flowing across the flow guide 80 to the second outlet 58. Instead, coolant entering the heat exchanger 20 from the inlet 48 flows through the core 60 to the outlet tank 50. From the outlet tank 50, a portion of the coolant flows out of the heat exchanger 20 through the first outlet 56, and a remainder of the coolant is forced back through the core 60 to the tank 42 where the coolant exits the heat exchanger 20 through the second outlet 58.

Connected to the first outlet 56 is a first component 210 to be cooled or warmed by the coolant. Connected to the second outlet 58 is a second component 212 to be cooled or warmed by the coolant. The first and second components 210 and 212 can be any suitable components, devices, equipment, machinery, systems, etc. in need of being cooled or warmed by coolant passing through the heat exchanger 20. The first and second components 210 and 212 can be connected to any other components as well, and be directly or indirectly connected to the inlet 48 in order to direct coolant back into the heat exchanger 20.

The flow guide 80 is advantageously movable along the height H of the tank 42 in order to vary the amount of coolant flowing to the first component 210 and the second component 212. For example, and as illustrated in FIG. 11B, moving the flow guide 80 away from the inlet 48 and towards the second outlet 58 increases the amount of coolant flowing to the first component 210, and decreases the amount of coolant flowing to the second component 212. Thus when the first component 210 requires additional coolant, such as due to increased performance demands, the control module 150 moves the flow guide 80 away from the inlet 48 and towards the second outlet 58. When the second component 212 requires additional coolant due to increased performance commands, the control module 150 will move the flow guide 80 away from the second outlet 58 and towards the inlet 48, as illustrated in FIG. 11C, for example. Thus as illustrated in FIG. 11C, moving the flow guide 80 away from the second outlet 58 results in the second component 212 receiving more coolant than the first component 210 (in order to satisfy the increased performance demands of the second component 212.

The heat exchanger 20 as configured in FIGS. 11A-11C advantageously provides coolant of variable temperatures to the first component 210 and the second component 212. For example, coolant flowing to the first component 210 is cooled by the core 60 as the coolant flows from the inlet tank 42 to the outlet tank 50. Coolant flowing to the second component 212 is not only cooled as it flows from the inlet tank 42 to the outlet tank 50, but is further cooled as the coolant flows through the core 60 from the outlet tank 50 back to the inlet tank 42. Thus coolant flowing to the second component 212 generally has a lower temperature than coolant flowing to the first component 210.

Figure 12A:
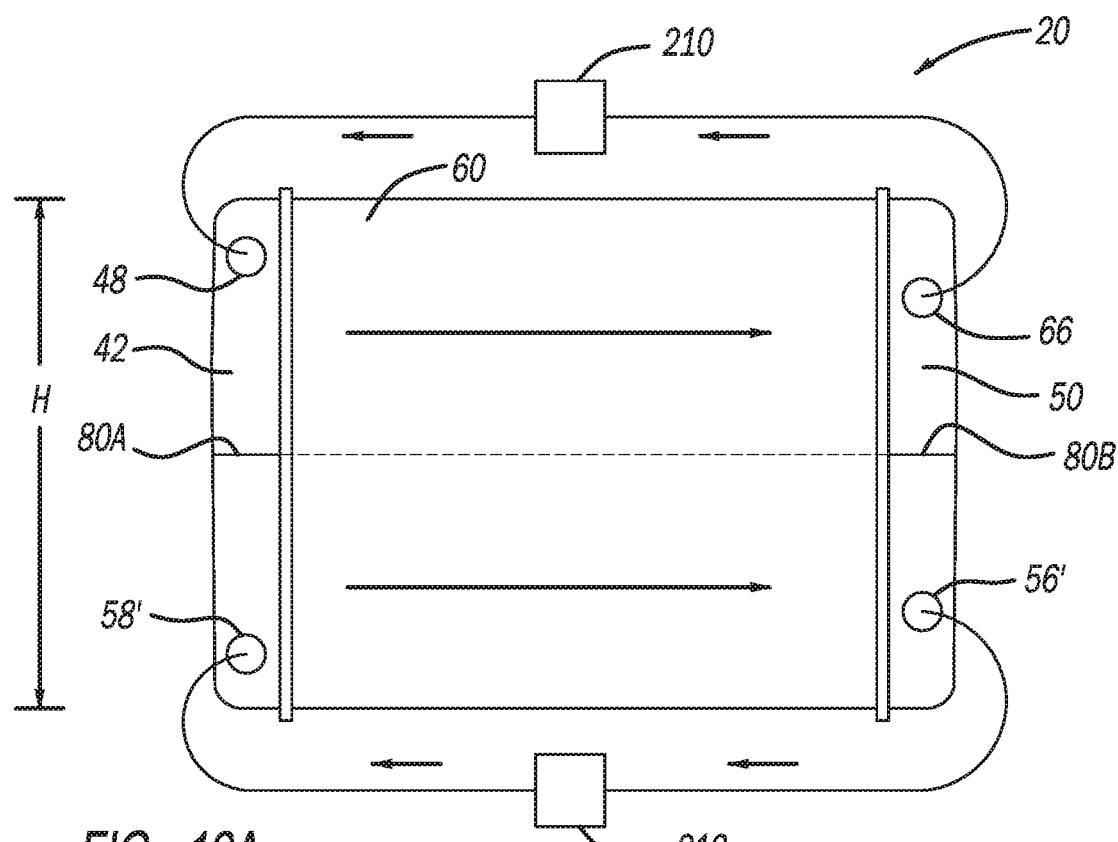
FIG. 12A is a plan view of an additional heat exchanger in accordance with the present disclosure.

FIGS. 12A, 12B, and 12C illustrate an additional heat exchanger 20 in accordance with the present disclosure. In the example of FIGS. 12A-12C, the inlet 48 is a first inlet. The second outlet 58 is configured as a second inlet 58', and the first outlet 56 is configured as a second outlet 56'. A first outlet 66 is defined at the outlet tank 50. The first component 210 is connected to the first inlet 48 and the first outlet 66. Thus coolant exiting the heat exchanger 20 through the first outlet 66 flows to the first component 210, and returns to the heat exchanger 20 through the first inlet 48. The second component 212 is connected to the second inlet 58' and the second outlet 56'. Thus coolant exiting the heat exchanger 20 through the second outlet 56' flows to the second component 212, and returns to the heat exchanger 20 through the second inlet 58'. The first and second components 210 and 212 are connected to the heat exchanger 20 in any suitable manner, such as with any suitable conduits including any suitable piping.

The flow guide 80 is arranged in the inlet tank 42, and designated in FIGS. 12A, 12B, and 12C at reference numeral 80A. The outlet tank 50 includes a second flow guide 80B, which is similar to, or the same as, the first flow guide 80A. Thus the description of the flow guide 80 set forth above also describes the second flow guide 80B. The first and second flow guides 80A and 80B are arranged to restrict coolant from flowing across the respective flow guides 80A and 80B. Specifically, flow guide 80A prevents coolant from flowing directly from the first inlet 48 to the second inlet 58'. Similarly, the second flow guide 80B prevents coolant from flowing across the second flow guide 80B from the first outlet 66 directly to the second outlet 56'.

The control module 150 controls movement of both the first flow guide 80A and the second flow guide 80B along the heights H of the inlet tank 42 and the outlet tank 50 respectively in order to vary the amount of coolant flowing to the first component 210 and the second component 212. Specifically and with reference to FIG. 12B, the control module 150 is configured to move the first flow guide 80A and the second flow guide 80B away from the first inlet 48 and the first outlet 66 respectively, and towards the second inlet 58' and the second outlet 56' respectively. Arranging the first and second flow guides 80A and 80B in the positions illustrated in FIG. 12B increases the amount of coolant flowing to and out of the first outlet 66 to the first component 210 in order to accommodate increased performance demands of the first component 210. On the other hand, relatively less coolant flows out of the second outlet 56' to the second component 212. In order to accommodate increased performance demands of the second component 212, the control module 150 moves the flow guides 80A and 80B towards the first inlet 48 and the first outlet 66 respectively, as illustrated in FIG. 12C. Thus coolant flow to the second component 212 will be increased in order to increase performance demands of the second component 212. Consequently, coolant flow to the first component 210 is decreased. In some applications, these two circuits (one circuit including the first component 210 and another circuit including the second component 212) can be separated and individually controlled, such as by using a separate pump for each circuit. The surface area of the heat exchanger 20 can be changed by modifying the position of the first and second flow guides 80A and 80B to change performance of each one of the circuits.

Thus the heat exchangers 20 as set forth in the examples of FIGS. 11A-12C can advantageously change the volume split ratio of coolant flowing from the heat exchanger 20 to various components, such as first component 210 and second component 212. The heat exchangers 20 as configured in FIGS. 11A-12C are suitable for use in the cooling system 10 illustrated in FIGS. 1-3, as well as any other suitable cooling system. Exemplary performance demands include heat rejection amount, outlet temperature of water/coolant, etc.

Figure 13:
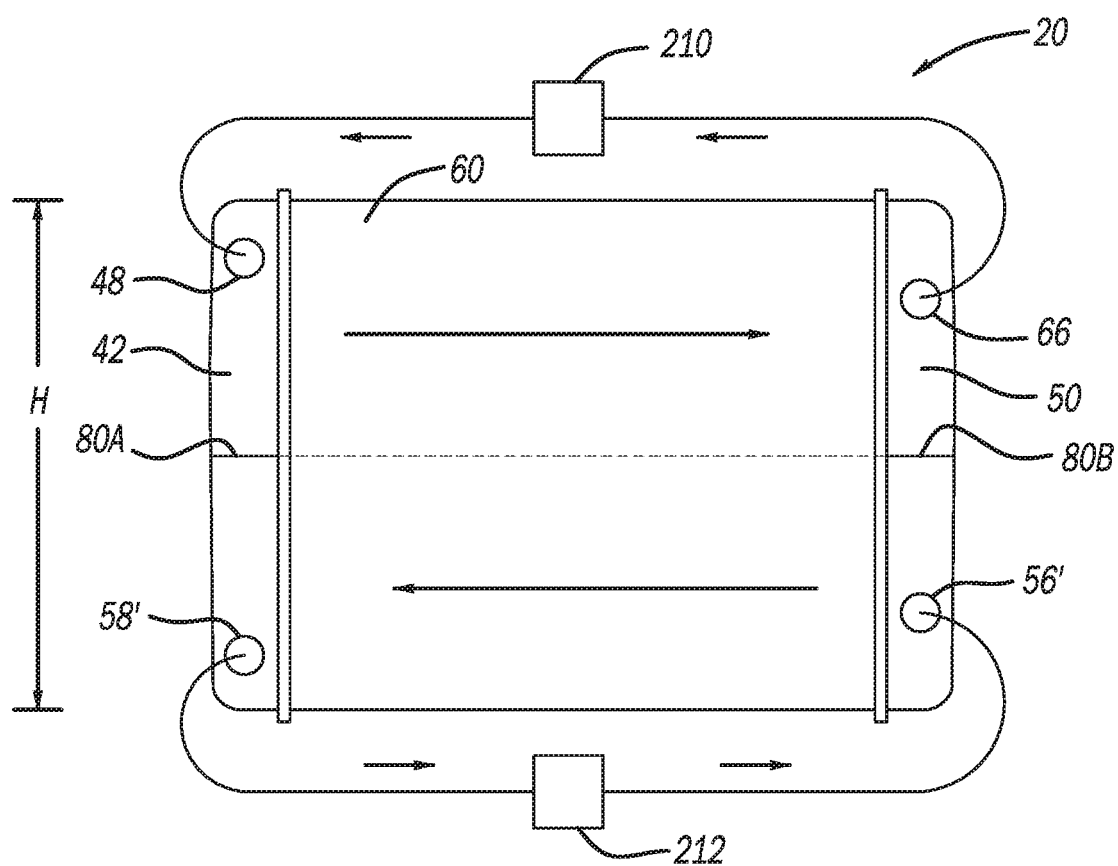
FIG. 13 illustrates an additional heat exchanger in accordance with the present disclosure.

FIGS. 12A-12C illustrate coolant flowing through the conduits of the core 60 to the first component 210 and the second component 212 in the same direction. As illustrated in FIG. 13, however, the coolant flow can be configured so that coolant flows through the core 60 in opposite directions. This advantageously reduces thermal stress in the heat exchanger 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:
1. A heat exchanger comprising:
a first tank having a first inlet through which coolant flows into the first tank;
a core having a plurality of coolant conduits that receive coolant from the first tank;
a second tank that receives coolant from the plurality of coolant conduits, the second tank has a first outlet through which coolant flows out from within the second tank; and
a flow guide within the first tank or the second tank, and movable to vary how much coolant flows through different ones of the plurality of coolant conduits;
wherein the flow guide is a flow guide assembly including a guide plate, an extension mechanism that moves the guide plate along the first tank, and a rotation mechanism that rotates the guide plate.

2. The heat exchanger of claim 1, wherein the first tank further includes a second outlet through which coolant flows out from within the first tank; and wherein the flow guide restricts coolant from flowing across the flow guide within the first tank from the first inlet to the second outlet, the flow guide is movable along the first tank to vary how much coolant flows through the first outlet and the second outlet.

3. The heat exchanger of claim 2, wherein:

moving the flow guide towards the first inlet and away from the second outlet decreases coolant flow through the first outlet and increases coolant flow through the second outlet; and moving the flow guide away from the first inlet and towards the second outlet increases coolant flow through the first outlet and decreases coolant flow through the second outlet.

4. The heat exchanger of claim 3, wherein the first outlet is connected to a first component, the second outlet is connected to a second component, and the first inlet receives coolant from both the first component and the second component.

5. The heat exchanger of claim 1, wherein the extension mechanism includes a telescoping member; and the rotation mechanism includes a pair of meshed gears.

6. A heat exchanger comprising:

a first tank having a first inlet through which coolant flows into the first tank;

a core having a plurality of coolant conduits that receive coolant from the first tank;

a second tank that receives coolant from the plurality of coolant conduits, the second tank has a first outlet through which coolant flows out from within the second tank; and a flow guide within the first tank or the second tank, and movable to vary how much coolant flows through different ones of the plurality of coolant conduits;

wherein the heat exchanger is arranged such that an obstacle that would impact airflow to the heat exchanger is between the heat exchanger and an active grill shutter, and a fan is on a side of the heat exchanger that is opposite to the obstacle; and wherein the obstacle is arranged such that the obstacle opposes less than an entirety of an upstream side of the heat exchanger so that a first portion of airflow flowing to and through the heat exchanger does not pass through the obstacle and a second portion of airflow flowing to and through the heat exchanger passes through the obstacle before flowing through the heat exchanger.

7. The heat exchanger of claim 6, wherein when the active grill shutter is open the flow guide is positioned to increase coolant flow at a first portion of the core and decrease coolant flow at a second portion of the core.

8. The heat exchanger of claim 6, wherein the second portion of the core opposes the obstacle, and the first portion of the core does not oppose the obstacle.

* * * * *

UNITED STATES PATENT AND TRADEMARK OFFICE
CERTIFICATE OF CORRECTION

PATENT NO. : 10,538,214 B2
APPLICATION NO. : 15/813549
DATED : January 21, 2020
INVENTOR(S) : Yilin Tian Page 1 of 1

It is certified that error appears in the above-identified patent and that said Letters Patent is hereby corrected as shown below:

In the Claims

Column 11, Line 26 In Claim 5, delete "member;" and insert --member,-- therefor

Signed and Sealed this
Tenth Day of March, 2020

Andrei Iancu
*Director of the United States Patent and Trademark Office*